United States Patent
Dehlwes

(10) Patent No.: US 10,060,496 B2
(45) Date of Patent: Aug. 28, 2018

(54) AIR SPRING

(71) Applicant: Vibracoustic CV Air Springs GmbH, Hamburg (DE)

(72) Inventor: Stephan Dehlwes, Norderstedt (DE)

(73) Assignee: VIBRACOUSTIC CV AIR SPRINGS GMBH, Hamburg (DE)

( * ) Notice: Subject to any disclaimer, the term of this patent is extended or adjusted under 35 U.S.C. 154(b) by 0 days.

(21) Appl. No.: 15/409,574

(22) Filed: Jan. 19, 2017

(65) Prior Publication Data

US 2017/0204928 A1    Jul. 20, 2017

(30) Foreign Application Priority Data

Jan. 20, 2016    (DE) .................. 10 2016 100 939

(51) Int. Cl.
*F16F 9/04*     (2006.01)
*B60G 11/27*    (2006.01)
*F16F 9/05*     (2006.01)

(52) U.S. Cl.
CPC ............ *F16F 9/0454* (2013.01); *B60G 11/27* (2013.01); *F16F 9/052* (2013.01); *B60G 2206/424* (2013.01); *B60G 2206/81012* (2013.01); *B60G 2300/02* (2013.01); *B60G 2300/04* (2013.01); *F16F 2226/041* (2013.01)

(58) Field of Classification Search
CPC ........ B60G 11/2227; B60G 11/28; F16F 9/04; F16F 9/0454; F16F 9/0463
USPC .................................... 267/64.21–62.28, 124
See application file for complete search history.

(56) References Cited

U.S. PATENT DOCUMENTS

| | | | |
|---|---|---|---|
| 4,784,376 A | 11/1988 | Ecktman | |
| 4,787,606 A * | 11/1988 | Geno | F16F 9/0463 267/64.24 |
| 5,226,082 A * | 7/1993 | Kustka | H03M 7/425 341/67 |
| 5,382,006 A | 1/1995 | Arnold | |
| 5,934,652 A * | 8/1999 | Hofacre | B60G 7/04 267/64.23 |
| 6,386,524 B1 * | 5/2002 | Levy | B60G 11/28 267/64.21 |
| 6,682,058 B1 | 1/2004 | Nemeth et al. | |
| 8,070,144 B2 * | 12/2011 | Lamb | B60G 11/22 267/220 |
| 8,220,785 B2 * | 7/2012 | Bank | F16F 9/0463 267/64.27 |
| 9,156,326 B2 * | 10/2015 | Koeske | B60G 11/28 |
| 2008/0246198 A1 * | 10/2008 | Levy | B60G 11/28 267/124 |

(Continued)

FOREIGN PATENT DOCUMENTS

DE    69407244 T2    6/1998
DE    20023582 U1    12/2004

(Continued)

*Primary Examiner* — Christopher P Schwartz
(74) *Attorney, Agent, or Firm* — Leydig, Voit & Mayer, Ltd.

(57) ABSTRACT

An air spring includes a rolling piston having a fastening section. An air spring bellows has at least a first one-sided bead portion and a buffer element. The first bead portion bears against an outer side of the fastening section. The buffer element is fixed onto the outer side of the fastening section via a snap-lock connection.

13 Claims, 4 Drawing Sheets

(56) References Cited

U.S. PATENT DOCUMENTS

| | | | | |
|---|---|---|---|---|
| 2009/0200717 | A1* | 8/2009 | Rebernik | B60G 11/28 |
| | | | | 267/64.24 |
| 2011/0266728 | A1* | 11/2011 | Bank | F16F 9/0454 |
| | | | | 267/64.27 |
| 2012/0205844 | A1 | 8/2012 | Koeske et al. | |
| 2013/0147100 | A1 | 6/2013 | Schaefers | |
| 2014/0239606 | A1* | 8/2014 | Koeske | F16F 9/057 |
| | | | | 280/124.16 |

FOREIGN PATENT DOCUMENTS

| | | |
|---|---|---|
| DE | 102008055511 A1 | 6/2010 |
| EP | 0123171 A2 | 10/1984 |
| EP | 1031756 A2 | 8/2000 |
| JP | 47258 U | 6/1972 |
| WO | WO 0142678 A1 | 6/2001 |
| WO | WO 2012019805 A1 | 2/2012 |

\* cited by examiner

AIR SPRING

CROSS-REFERENCE TO PRIOR APPLICATION

Priority is claimed to German Patent Application No. DE 10 2016 100 939.3, filed on Jan. 20, 2016, the entire disclosure of which is hereby incorporated by reference herein.

FIELD

The present invention relates to an air spring, in particular an air spring for commercial vehicles.

BACKGROUND

Air springs are used to alleviate two mutually movable parts of the vehicle or to change the height level of a vehicle. Known air springs comprise an air spring bellows made of rubber which is connected to an upper closure element, being generally in form of a plate, and to a rolling piston, in order to form an airtight working room. During compression and rebound, the air spring bellows rolls on the outer surface of the rolling piston and compresses the air enclosed in the working room. Thereby, a suspending and/or damping effect is achieved.

For fastening of the air spring bellows on the rolling piston, it is known to provide the air spring bellows with a one-sided bead portion, which is slid open onto a fastening section of the rolling piston. In order to prevent the air spring bellows from being pulled off the rolling piston various measures are known.

A rolling piston is known from DE 694 07 244 T2, whose fastening section is formed from a rounded shoulder sloping inwardly and downwardly to a horizontal flange, and a bead seat area being perpendicular to the flange, wherein a bead portion of an air spring bellows sealingly bears against the shoulder and the bead seat area. In order to prevent the air spring bellows from being pulled off, a plate with an outer peripheral edge is disposed on the rolling piston, partially covering the bead portion of the air spring bellows to form a bead retention lip.

Further, a fastening section of a rolling piston formed as a conical seat is known from DE 10 2008 055 511 A1, the fastening section being provided with a retaining collar in the upper region to hold a bead portion of an air spring bellows and a recess in the lower region between the conical seat and a shoulder to at least partially receive the bead portion.

A further measure to secure a bead portion from being pulled off the rolling piston is known from WO 2012/019805 A1. For this purpose an annular groove into which a locking ring is clipped after the mounting of the air spring bellows is introduced into a fastening section of a rolling piston. The locking ring prevents slipping of the air spring bellows off the fastening section of the rolling piston.

Further, it is known to provide the rolling piston with a buffer element on a side facing the working room which serves as an end stop for the rolling piston to limit the movement of the rolling piston in axial direction.

An air spring with a rolling piston and a buffer element is apparent from US 2008/0246198 A1, the buffer element being connected to the rolling piston via a radially inward snap-lock connection. For this purpose a radially inwardly projecting first latching nose is provided on an inner side of a fastening section formed on a rolling piston, the first latching nose interacting with a second latching nose disposed on a retainment ring connected to the buffer element.

Further, an air spring is apparent from WO 01/42678 A1 whose rolling piston is provided with a buffer element. Furthermore, the buffer element prevents the bead portion of an air spring bellows from being pulled off the rolling piston by the buffer element partial covering a portion of the bead portion. The buffer element is connected via a snap-lock connection with the rolling piston by forming an indentation in the rolling piston interacting with a spring element formed on a buffer element. The rolling piston is thereby complex and expensive to manufacture.

SUMMARY

In an embodiment, the present invention provides an air spring includes a rolling piston having a fastening section. An air spring bellows has at least a first one-sided bead portion and a buffer element. The first bead portion bears against an outer side of the fastening section. The buffer element is fixed onto the outer side of the fastening section via a snap-lock connection.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
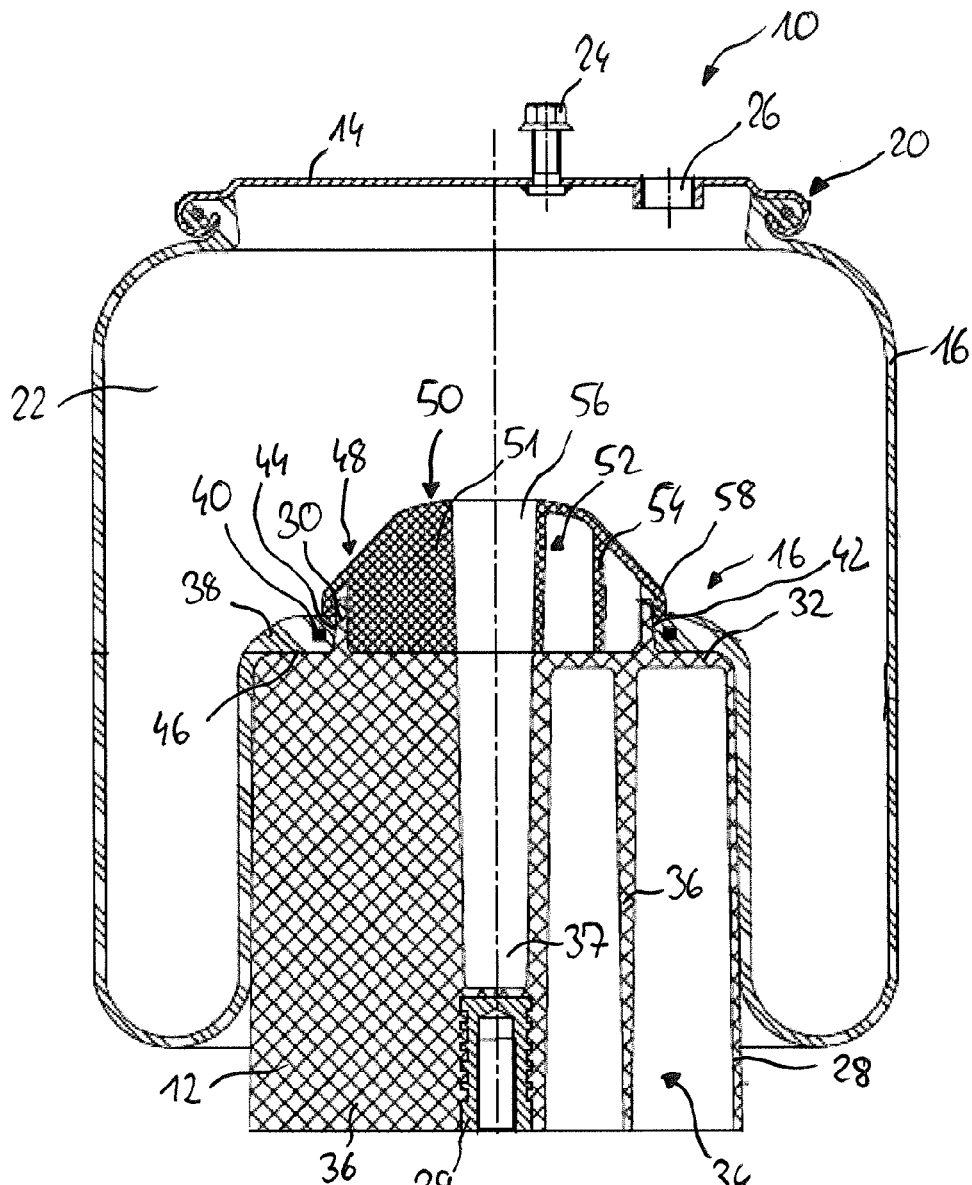
FIG. 1 a cross section through an air spring with a buffer element disposed on a rolling piston according to a first embodiment.

In an embodiment, the invention provides an air spring whose rolling piston is simple and inexpensive to manufacture, and furthermore allows for a simple and secure fastening of a buffer element on the rolling piston.

In the context of the invention, a snap-lock connection can also be referred to as a snap connection or a detachable connection.

According to an embodiment, an air spring, in particular an air spring for a commercial vehicle, comprises a rolling piston, an air spring bellows having at least one one-sided bead portion, and a buffer element, wherein the rolling piston comprises a fastening section, wherein the bead portion bears against an outer side of the fastening section. The buffer element is fixed onto the outer side of the fastening section via a snap-lock connection. Since the outer shape of the fastening section is used for fastening the buffer element, no additional fastening shape is required on the rolling piston. The rolling piston can thereby be manufactured in a simple and inexpensive way. Moreover, the snap-lock connection allows for a simple and secure fastening of the buffer elements on the rolling piston.

In a preferred embodiment, the fastening section comprises a first snap-lock device interacting with a second snap-lock device formed on the buffer element. Thereby, a simple and inexpensive fastening for the buffer element is provided on the rolling piston. Preferably both of the snap-lock devices form the snap-lock connection. Further, preferably both of the snap-lock devices are formed such that the snap-lock connection is detachable. It is possible thereby to replace the buffer element.

The first snap-lock device preferably comprises at least one latching nose projecting radially from the fastening section. Since the latching nose is disposed on the outer side of the fastening section, in particular on its outer shape, the rolling piston can be manufactured in a simple way, such as via injection molding. The latching nose is preferably circumferentially formed. The at least one latching nose is preferably attached to the fastening section in a coordinated material way. Further, the first snap-lock device can comprise at least two of the latching noses projecting radially from the fastening section. Furthermore, the fastening section can comprise a plurality of radially projecting latching noses spaced in equidistant intervals from one another along the outer side.

The second snap-lock device preferably comprises at least one projection interacting with the first snap-lock device. The projection projects preferably radially inwardly from the buffer element, wherein the first snap-lock device, in particular the at least two latching noses of the first snap-lock device, engage the projection in the engaged state.

The second snap-lock device preferably comprises a plurality of projections spaced apart in equidistant intervals along the buffer element. By segmenting the projections on the buffer element, the buffer element can be inexpensively manufactured without indentation.

In a preferred embodiment, a portion of the buffer element bears against the bead portion in the fixed state. The buffer element thereby secures the bead portion from being pulled off the rolling piston. The second snap-lock device preferably bears against the buffer element.

In a preferred embodiment, the buffer element is fitted into an orifice formed by the fastening section, wherein an edge portion of the buffer element surrounds the fastening section along its outer circumference. The buffer element thereby secures the bead portion from being pulled off the rolling piston.

In a preferred embodiment, the edge portion comprises the second snap-lock device. The edge portion, in particular, its free end preferably bears against the bead portion in a fixed state. Thereby, the outer shape of the fastening section of the rolling piston can be used for fastening the buffer element by engaging the projects, projecting radially inwardly from the edge portion, with the latching noses, projecting radially outwardly from the fastening section. A portion of the edge portion is preferably conically formed, wherein the projections project radially inwardly from the free end of the edge portion.

The edge portion preferably comprises an elevation on its free end. The elevation preferably bears against the bead portion. Furthermore, the elevation is preferably formed as a pointed shape. Thereby, a tolerance compensation for the buffer element can be provided.

The fastening section is preferably formed as a conical seat. The conical seat serves as a clamping seat or a plug seat for the bead portion, by fitting a conically formed sealing surface of the bead portion onto the outer side of the fastening section.

The bead portion preferably comprises a bead core and a conical sealing surface, wherein the conical sealing surface sealingly bears against the outer side of the fastening section. The bead core is preferably embedded into the bead portion. Furthermore, the bead core is preferably formed as an angular body with tensile strength and can me manufactured from steel or steel wire. The bead core sealingly bears under the influence of the inner pressure of the air spring bellows against the fastening section.

The rolling piston can comprise a shoulder portion being perpendicular to the fastening section, wherein the bead portion bears against the shoulder portion.

The rolling piston is preferably formed as a single piece and comprises a reinforcing structure. The reinforcing structure can comprise a plurality of reinforcing rips formed onto an inner surface of the rolling piston. In a preferred embodiment the reinforcing rips are formed as horizontal, vertical and/or circular rips, spaced in equidistant intervals from one another. Through its single-piece shape the rolling piston comprises a high strength and a high sealability.

Furthermore, the buffer element is preferably formed as a single piece and comprises a reinforcing configuration. The reinforcing configuration can comprise a plurality of rips formed onto an inner surface of the buffer element. In a preferred embodiment the rips are formed as horizontal, vertical and/or circular rips spaced in equidistant intervals from one another. The buffer element comprises a high strength through its single piece shape.

In a preferred embodiment, the rolling piston is manufactured as an injection molded part, in particular an injection molded part made of plastic. Thereby, the rolling piston can be manufactured in a simple and inexpensive way. The rolling piston is preferably manufactured from a composite material, in particular from polyamide (PA) with glass fibers or polypropylene (PP) with glass fibers. Thereby, the rolling piston comprises a high strength and simultaneously a low weight. The rolling piston can be also manufactured from metal, in particular from steel or aluminum.

In a preferred embodiment, the buffer element is formed an injection molded part, in particular as an injection molded part made of plastic. The buffer element can be manufactured from a composite material or an elastomer material.

In FIG. 1 an air spring 10 is shown which can be arranged between a bearing part of a vehicle, in particular of a commercial vehicle, and a chassis part, such as a chassis axle of a commercial vehicle or a trailer.

The air spring 10 comprises a rolling piston 12, a terminating element 14, an air spring bellows 16, and a buffer element 50. The air spring bellows 16 is connected on a first free end 18 with the rolling piston 12 and on a second free end 20 with the terminating element 14 to form a working room 22 filled with a fluid, in particular with air. The terminating element 14 is formed as a plate, wherein the second free end 20, in particular a bead portion with a bead core, is clamped with an edge portion of the terminating element 14. Further, the terminating element 14 comprises fastening elements 24 for fastening a bearing part of a vehicle, in particular of a commercial vehicle, and a connection 26 in form of an orifice to insert a filler, in order to fill the working rooms 22 with a fluid, in particular air.

The rolling piston 12 is formed as a hollow cylinder and comprises a piston wall 28, a fastening section 30 and a shoulder portion 32 connecting together the piston wall 28 and the fastening section 30. Inside the piston wall 28 a reinforcing structure 34 is disposed, comprising a plurality of reinforcing rips 36 spaced apart in equidistant intervals from one another, projecting radially inwardly from the piston wall 28 and being firmly connected (material-locking) thereto. Further, the reinforcing structure 34 forms a central blind hole 37 corresponding to an opposite threaded bushing 39 inserted into the rolling piston for fastening of the rolling piston 12 on a chassis part. As seen in FIG. 1, the air spring bellows 16 rolls on the outer face of the piston wall 28 during compression and rebound. The rolling piston 12 is manufactured in a single piece as an injection molded part, in particular an injection molded part made of plastic, furthermore in particular from a polyamide (PA) with glass fibers or polypropylene (PP) with glass fibers.

The first free end 18 of the air spring bellows 16 comprises a bead portion 38 with an embedded, inelastic bead core 40. The fastening section 30 is formed as a conical seat which tapers upwards in a conical form and serves as clamping seat or a plug seat for the bead portion 38, by sealingly bearing a cone-shaped sealing surface 42 of the bead portion 38 against an outer side 44 of the fastening section. Moreover, the bead portion 38 with its bottom side 46 bears against the shoulder portion 32.

As seen in FIG. 1, the buffer element 50 is inserted into the orifice 48 formed by the fastening section 30, wherein the buffer element 50 is fixed via a snap-lock connection onto the fastening section 30, in particular its outer side 44.

Figure 4:
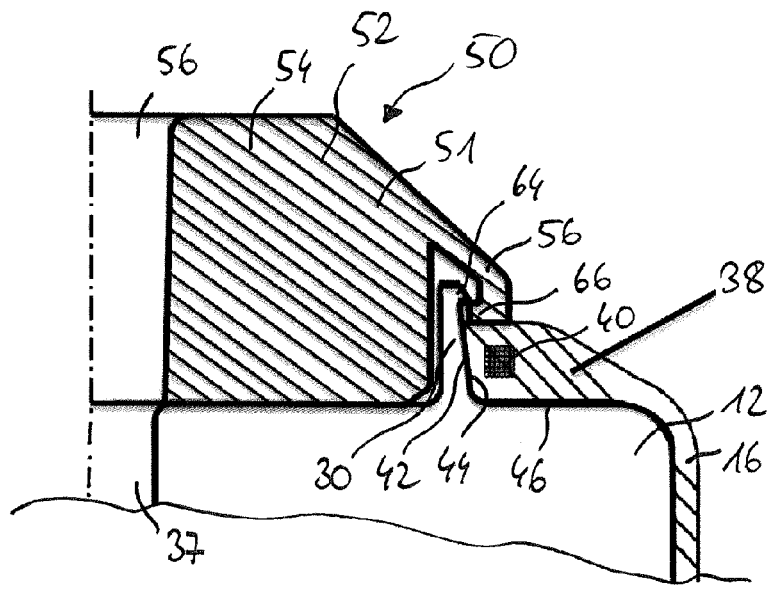
FIG. 4 an enlarged section of a cross section through a fastening region of an rolling pistons with a buffer element disposed in the fastening section according to a first embodiment.
Figure 5:
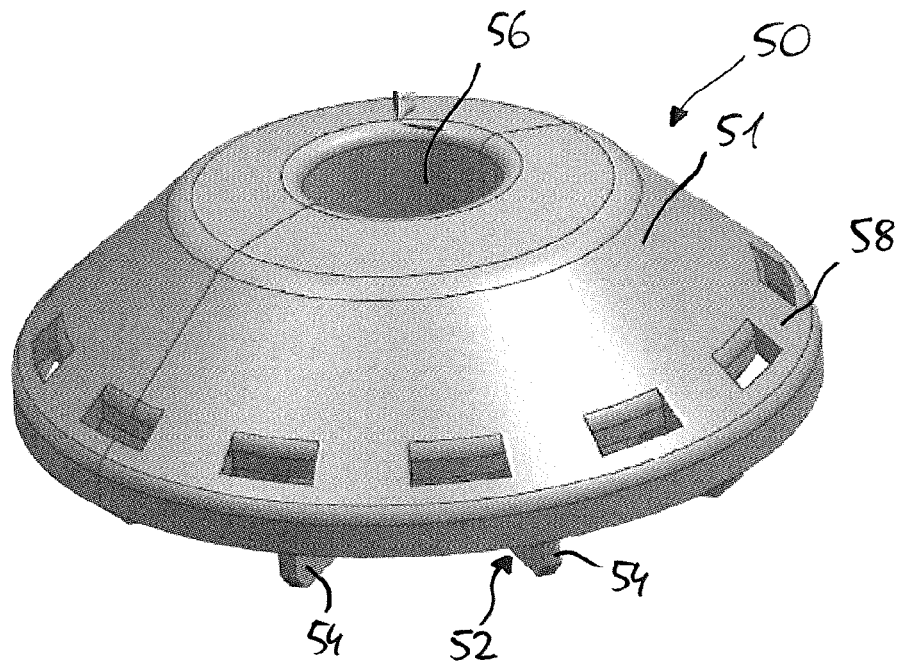
FIG. 5 a perspective view of a buffer element according to a first embodiment.
Figure 6:
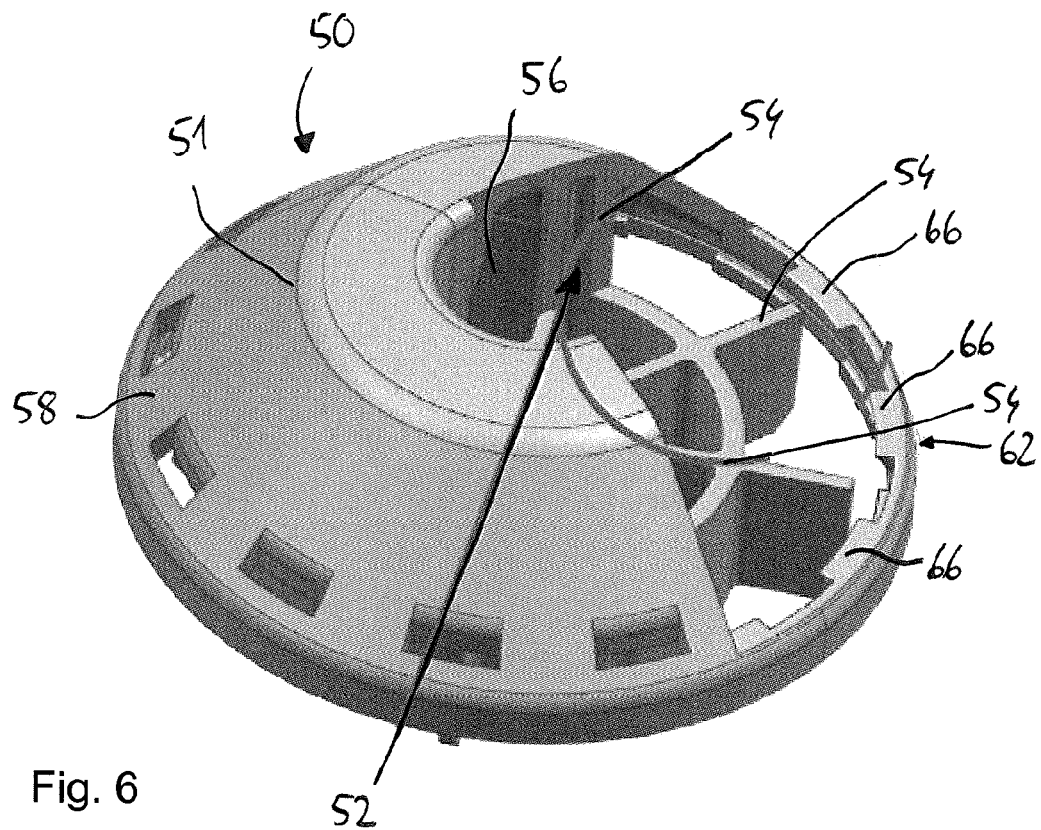
FIG. 6 a perspective view of a buffer element according to a first embodiment with a partial sectional view.
Figure 7:
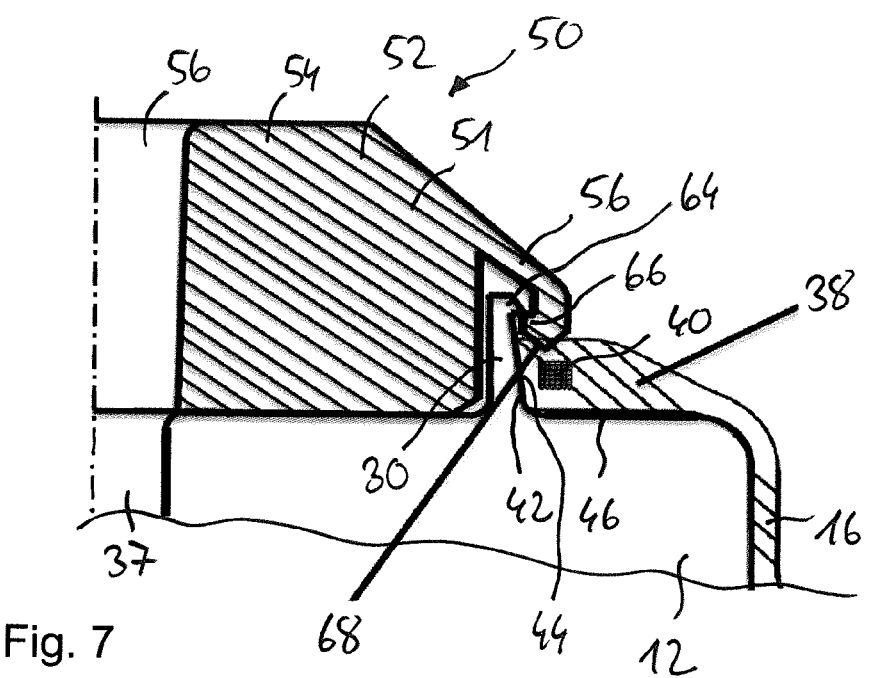
FIG. 7 an enlarged section of a cross section through a fastening section of a rolling piston and a buffer element disposed into it according to a second embodiment.

As depicted in FIGS. 5 and 6, the buffer element 50 is approximately mushroom-shaped and comprises a hollow main body portion 51 and an edge portion 58 projecting from the main body portion 51. As further seen in FIGS. 1 and 4, the edge portion 58 surrounds the fastening section 30 on the outer circumference in the inserted state of the buffer element 50. Inside the main body portion 51 is disposed a reinforcing configuration 52, comprising a plurality of rips 54 projecting from inner wall of the main body portion, as seen in FIG. 6. The reinforcing configuration 52 forms a central passage 56, aligned with the blind hole 37 in the inserted state of the buffer element 50. The buffer element 50 is formed as a single piece as an injection molded part, in particular an injection molded part made from plastic, from a composite material or from an elastomer material.

Figure 2:
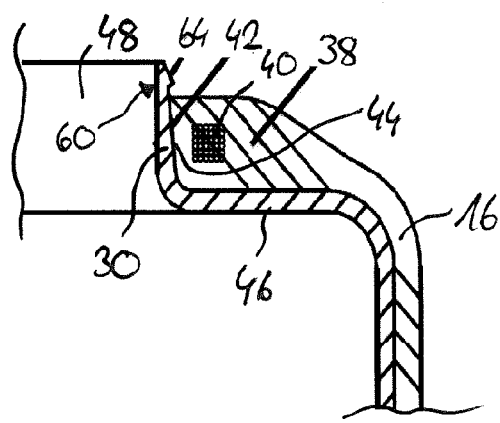
FIG. 2 an enlarged section of a cross section through a fastening region of a rolling piston with a bead portion of an air spring bellows bearing against it.

In order to fasten a buffer element 50 on the fastening section 30 via a snap-lock connection, the fastening section 30 comprises a first snap-lock device 60, interacting with a second snap-lock device 62 formed on a buffer element 50. As seen in particular in FIGS. 2 to 4, the first snap-lock device 60 comprises a latching nose 64 projecting radially, in particular circumferentially from the fastening section 30.

Figure 3:
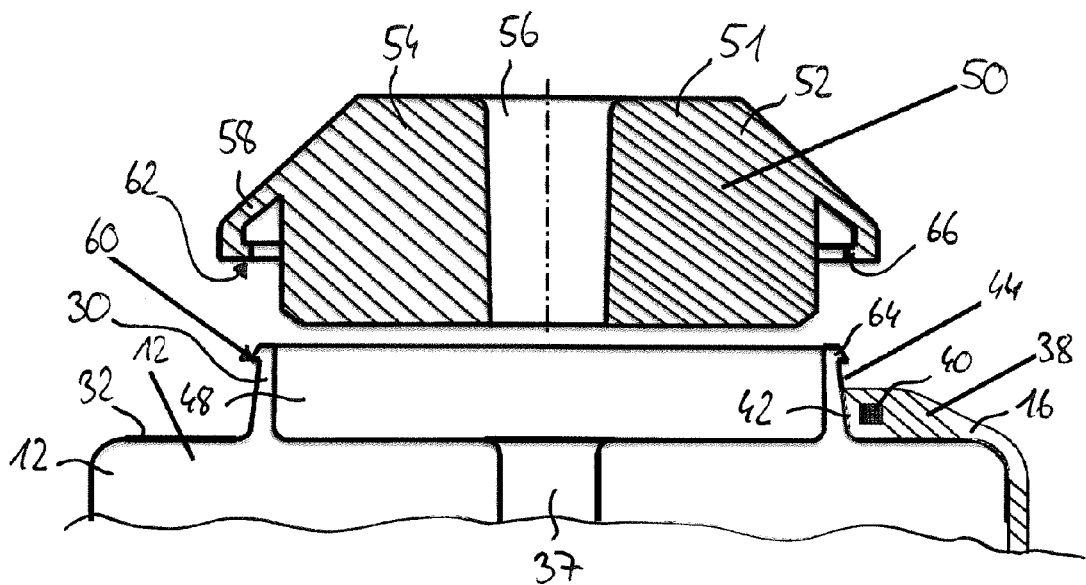
FIG. 3 an enlarged section of a cross section through a fastening section of a rolling piston and a buffer element according to a first embodiment before depositing the buffer element into the fastening section.

As depicted in FIGS. 3, 4, and 6, the second snap-lock device 62 comprises a plurality of projections 66 projecting radially inwardly from the edge portion 58 which are spaced in equidistant intervals along the inner circumference of the edge portion 58.

When inserting the buffer element 50 into the fastening section 30, in particular into the orifice 48, the latching nose 64 engages the projections 66, so that the buffer element 50 is fixed on the rolling piston 12, in particular on the outer side 44 of the fastening section 30. Moreover, the edge portion 58 bears against the bead portion 38, so that the bead portion 38 is prevented from being pulled off the rolling piston 12, in particular off the fastening section 30.

In FIG. 6 is shown a second embodiment of the buffer element 50, which differs from the first embodiment in that the free end of the edge portion 58 comprises an elevation 68, which ensures a tolerance compensation of the buffer element 50. The elevation 68 is thereby presented being formed as a pointed shape.

Since the outer side 44 of the fastening section 30 is used for fastening the buffer element 50, no additional fastening shape is required on the rolling piston 12. Thereby, the rolling piston 12 can be manufactured in a simple and inexpensive way, in particular using injection molding. Furthermore, the snap-lock connection allows for a simple and secure fastening of the buffer element 50 on the rolling piston 12. Moreover, the buffer element 50, in particular its edge portion 58, prevents a pulling of the bead portion 38 off the fastening section 30.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGN LIST 10 air spring
12 rolling piston
14 terminating element
16 air spring bellows
18 first free end
20 second free end
22 working room
24 fastening element
26 connection
28 piston wall
30 fastening section
32 shoulder portion
34 reinforcing structure 36 reinforcing rips
37 blind hole
38 bead portion
39 threaded bushing
40 bead core
42 sealing surface
44 outer side
46 bottom side
48 orifice
50 buffer element
51 main body portion
52 reinforcing configuration
54 rip
56 passage
58 edge portion
60 first snap-lock device
62 second snap-lock device
64 latching nose
66 projection
68 elevation

What is claimed is:

1. An air spring comprising:
a rolling piston having a fastening section; and
an air spring bellows having at least a first one-sided bead portion and a buffer element, the first bead portion bearing against an outer side of the fastening section,
wherein the buffer element is fixed onto the outer side of the fastening section via a snap-lock connection,
wherein an outer circumference of an edge portion of the buffer element surrounds the fastening section, the fastening section comprising a first snap-lock device interacting with a second snap-lock device formed at the edge portion of the buffer element, and
wherein the edge portion of buffer element bears against the bead portion in the fixed state thereby securing the bead portion from being pulled of the rolling piston.

2. The air spring according to claim 1, wherein the fastening section comprises a first snap-lock device interacting with a second snap-lock device formed on the buffer element.

3. The air spring according to claim 2, wherein the first snap-lock device comprises at least one latching nose projecting radially from the fastening section.

4. The air spring according to claim 2, wherein the second snap-lock device comprises at least one projection interacting with the first snap-lock device.

5. The air spring according to claim 4, wherein the second snap-lock device comprises a plurality of projections spaced apart in equidistant intervals along the buffer element.

6. The air spring according to claim 1, wherein the buffer element is fitted into an orifice formed by the fastening section.

7. The air spring according to claim 6, wherein a free end of the edge portion comprises an elevation.

8. The air spring according to claim 1, wherein the fastening section is formed as a conical seat.

9. The air spring according to claim 1, wherein the first bead portion comprises a bead core and a conical sealing surface, and wherein the conical sealing surface sealingly bears against the outer side of the fastening section.

10. The air spring according to claim 1, wherein the rolling piston comprises a shoulder portion that is perpendicular to the fastening section, and wherein the first bead portion bears against the shoulder portion.

11. The air spring according to claim 1, wherein the rolling piston is formed as a single piece and comprises a reinforcing structure.

12. The air spring according to claim 1, wherein the rolling piston is an injection molded part.

13. The air spring according to claim 1, wherein the buffer element is an injection molded part.

* * * * *